United States Patent Office 3,176,049
Patented Mar. 30, 1965

3,176,049
ALKYLATION OF AROMATIC COMPOUNDS
Donald L. Crain and Roy A. Gray, both of Bartlesville, Okla., assignors to Phillips Petroleum Company, a corporation of Delaware
No Drawing. Filed Sept. 5, 1961, Ser. No. 135,786
18 Claims. (Cl. 260—668)

This invention relates to the alkylation of aromatic compounds. In one aspect this invention relates to the reaction of aromatic compounds with cyclotriene compounds in the presence of an acidic or acid-acting catalyst.

It has recently been disclosed by G. Wilke in Angew Chem. 69, 397–8 (1957) that butadiene can be trimerized in 80 percent yield to trans,trans,cis-1,5,9-cyclododecatriene. This trimerization is carried out by means of a catalyst system comprising an organoaluminum such as triethylaluminum in conjunction with a metal halide such as $TiCl_4$. The cyclic triene formed boils at 100–101° C. @ 11 mm. Hg absolute pressure. Thus, this synthesis represents a method for preparing a 12-carbon compound from a compound of much lower molecular weight.

We have now discovered that trans,trans,cis-1,5,9-cyclododecatriene, and related compounds prepared by trimerizing compounds such as isoprene and piperylene, can be reacted with alkylatable aromatic compounds. Thus, broadly speaking, the present invention resides in the reaction of aromatic compounds with said cyclotriene compounds in the presence of an acidic or acid-acting catalyst.

It is realized that according to the classic definition "an alkylation process" is one in which an alkyl radical is introduced into or condensed with the compound or material being alkylated. However, in recent years the term "alkylation" has been employed in a much broader sense and applied to analogous processes in which radicals other than alkyl radicals are introduced into or condensed with the compound or material being alkylated. As discussed further hereinafter, it is believed clear that the overall process or reaction of the invention is analogous to an alkylation process or reaction in that a saturated polycyclic radical, not an alkyl radical, is substituted for a nuclear hydrogen atom in an aromatic compound. Thus, herein the terms "alkylation," "alkylating agent," "alkylate," etc. are employed in the broad sense indicated above.

An object of this invention is to provide new nuclear substituted aromatic compounds characterized by having a substituent on an aromatic ring thereof which is a polycyclic saturated hydocarbon radical. Another object of this invention is to provide a process for the reaction of aromatic compounds with cyclotriene compounds. Another object of this invention is to provide a process for alkylating aromatic compounds having at least one alkylatable nuclear carbon atom with a cyclotriene hydrocarbon having an empirical formula selected from the group consisting of $C_{12}H_{18}$ and $C_{15}H_{24}$. Other aspects, objects, and advantages of the invention will be apparent to those skilled in the art in view of this disclosure.

Thus according to the invention there is provided a nuclear substituted aromatic compound characterized by having a substituent on the aromatic nucleus thereof which is a saturated radical selected from the group consisting of

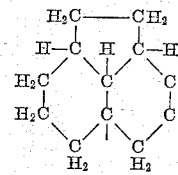  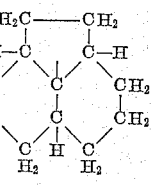

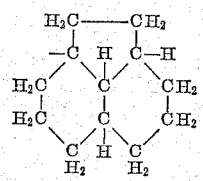

Further according to the invention there is provided a process for the alkylation of aromatic compounds with a cyclotriene hydrocarbon, which process comprises: contacting an aromatic compound with said cyclotriene hydrocarbon in the presence of an acid-acting alkylation catalyst under alkylation reaction conditions; and recovering an alkylated aromatic compound from the resulting reaction mixture.

The aromatic compounds which can be alkylated in the practice of the invention are those aromatic compounds which contain at least one alkylatable nuclear carbon atom, i.e., those aromatic compounds containing at least one nuclear carbon atom having an active hydrogen atom attached thereto which can be replaced by the alkylating group of the alkylating agents of the invention during the alkylation and in the presence of an acidic or acid-acting alkylation catalyst. Included among such aromatic compounds are the monocyclic, dicyclic, and tricyclic aromatic hydrocarbons, and even those containing more than three rings. Also included are the alkylatable derivatives of said aromatic hydrocarbons which contain non-reactive substituents such as halo-, hydroxy-, alkoxy-, amino-, substituted amino-, nitro-, carboxyl-, and similar radicals. Said aromatic compounds or reactants may contain one or more, but preferably not more than three of said nuclear substituents, provided that the number of said nuclear substituents does not interfere by steric hindrance with the attachment of the alkylating group when it replaces the active hydrogen attached to a nuclear carbon atom.

Examples of monocyclic aromatic hydrocarbons which can be used in the practice of the invention include, among others, the following: benzene, toluene, the isomeric xylenes, ethylbenzene, n-propylbenzene, isopropylbenzene, the ethyl toluenes, the ethyl xylenes, pseudocumene, hemimellitene, sec-butylbenzene, t-butylbenzene, isodurene, diethylbenzenes, prehnitene, isoamylbenzene, and the like.

Examples of dicyclic aromatic hydrocarbons which can be used in the practice of the invention include, among others, the following: naphthalene; alkylnaphthalenes such as 1-methylnaphthalene, 2-methylnaphthalene, 1-isopropylnaphthalene, 2-ethylnaphthalene, 2,6-dimethylnaphthalene, isopropylnaphthalene, and the like; diphenyl, alkyl-substituted diphenyls; indene, alkylindenes, dihy-droindenes; and the like.

Examples of tricyclic aromatic hydrocarbons which can be used in the practice of the invention include, among others, the following: anthracene; the various alkyl anthracenes; phenanthrene; and the like.

Examples of other aromatic compounds, which can be considered as derivatives of aromatic hydrocarbons, and which can be used in the practice of the invention include, among others, the following: the various phenolic compounds such as phenol, pyrocatechol, resorcinol, hydroquinone, pyrogallol, and the like; phenolic ethers such as phenetole, anisole, phenyl-t-butyl ether; and the like. Also included are halogenated aromatic hydrocarbons such as chlorobenzene, dichlorobenzenes, bromobenzene, fluorobenzene, iodobenzene, 2-chloronaphthalene, orthochlorotoluene, parachlorotoluene, etc.

Thus, the only requirement with respect to the aromatic compound which is subjected to alkylation in the practice of the invention is that said aromatic compound be characterized by a replaceable nuclear hydrogen atom as an essential structural characteristic thereof, which hydrogen atom can be replaced during the alkylation reaction by the alkylating group of the alkylating agent.

Catalysts which can be utilized in the practice of the invention are those acidic or acid-acting inorganic compounds which are capable of catalyzing the required hydrogen and alkylating group transfer reactions which are involved in the alkylation process. Acid-acting inorganic compounds having such catalyzing activity include certain mineral acids, such as concentrated sulfuric acid containing not more than 10 percent by weight of water and preferably less than 5 percent by weight of water, concentrated hydrofluoric acid of at least 90 percent HF content and containing less than 10 percent by weight of water, liquefied anhydrous hydrogen fluoride, anhydrous aluminum chloride, anhydrous aluminum bromide, boron trifluoride, mixtures of boron trifluoride and hydrofluoric acid, and other acid-acting catalysts, particularly of the Friedel-Crafts class of metallic halides. A portion of the catalyst charged to the reaction zone may comprise recycled partially spent catalyst from a previous alkylation reaction which may be combined with fresh acidic catalyst and the mixture charged to the reaction zone.

Of said acidic or acid-acting catalysts which can be utilized in the practice of the invention, the presently more preferred catalysts are aluminum chloride, aluminum bromide, hydrogen fluoride, sulfiuric acid, and boron trifluoride.

A presently most preferred catalyst for use in the practice of the invention is aluminum chloride, which may be charged as such in its essentially anhydrous form or in the form of complexes with hydrocarbons. It is recognized that if aluminum chloride or aluminum bromide is charged to the reaction zone as a pure compound it quickly reacts with the cyclotriene alkylating agent to form a complex which then serves as the reaction catalyst.

The quantity of catalyst employed in the practice of the invention to promote the alkylation of a given weight of aromatic compound will be dependent upon the catalyst selected, the ease of alkylation, and operating conditions such as temperature and degree of dispersion of the catalyst in the aromatic compound to be alkylated. The amount of catalyst employed can vary over a wide range, but the catalyst in the total reaction mixture will generally be present in an amount so as to comprise from 1 to 50 percent by weight, preferably from 5 to 25 percent by weight of the aromatic compound being alkylated.

The process of the invention can be carried out over a relatively wide range of temperature, the optimum temperature depending to a large extent on the aromatic compound being alkylated and the particular catalyst being employed. In order to control the rate of alkylation and increase the proportion of mono alkylated derivatives, the temperature is usually maintained within the range of from $-50$ to $+150°$ F., with the somewhat narrower range of from about $+20$ to about $100°$ F. being preferred in a majority of the situations.

The reaction time will generally be within the range of from about 10 minutes to 6 hours, the shorter times being utilized at the higher reaction temperatures and vice versa.

The pressure employed is preferably substantially atmospheric but may be varied therefrom depending upon other reaction conditions. The process of the invention is carried out under liquid phase conditions and suitable superatmospheric pressures necessary to maintain said liquid phase conditions can be employed.

In the practice of the invention, the weight ratio of aromatic compound to cyclotriene alkylating agent will be in the range of from 2:1 to 20:1.

The process of the invention can be carried out with the liquid aromatic compound serving as the reaction medium, since the concentration of the alkylating agent is ordinarily maintained at low values in the alkylation zone, or the aromatic compound can be mixed with and/or dissolved in a suitable inert liquid diluent such as the praffin or cycloparaffin hydrocarbons of 5 to 8 or more carbon atoms. This practice is particularly advantageous when operating at low temperatures in order to prevent crystallization of the aromatic compounds. Similarly, when alkylating normally solid aromatics, they can be dispersed and/or dissolved in inert diluents and/or solvents such as the aliphatic or cycloaliphatic hydrocarbons mentioned above, or the like.

The process of the invention can be carried out either in a batchwise manner or continuously, preferably the latter. When employing a batchwise operation, the cyclotriene alkylating agent can be introduced intermittently or continuously at a rate equal to and preferably not exceeding that at which reaction takes place, into a vigorously agitated liquid mixture of a catalyst and the aromatic compound to be alkylated, which is either in liquid form as in the case of benzene and toluene, or in solution in a suitable solvent or diluent as in the case of solid aromatic compounds such as naphthalene, anthracene, etc. After the alkylation reaction has proceeded to the desired extent, the reaction is discontinued, and the reaction mixture is allowed to form two layers with the catalyst phase being the heavier. The phase containing the alkylated aromatic compound is then separated and the alkylated aromatic compound recovered therefrom in any suitable manner.

When operating in a continuous manner, one convenient method is to establish countercurrent flow between a first liquid phase containing the catalyst and a second liquid phase containing the aromatic hydrocarbon and the alkylating agent. For example, the liquid phase containing the catalyst can be introduced into the upper portion of a tower through which it then descends and the liquid phase containing the aromatic hydrocarbon and alkylating agent introduced into the lower portion of said tower through which it then ascends. The catalyst containing phase leaving the bottom of the tower can be recycled to the top and again introduced therein. Likewise, the aromatic liquid phase leaving the top of the tower, and preferably containing no unreacted alkylating agent, may be recycled to the bottom of the tower after suitable cooling. Fresh alkylating agent can be introduced into the bottom of the tower either as such or in admixture with, or in solution in, a suitable solvent or in the recycled aromatic phase. Fresh aromatic hydrocarbon may likewise be introduced at the proper rate to the bottom of the tower, usually in admixture with the recycled aromatic phase. As will be understood by those skilled in the art, equilibrium conditions will be established within the tower and a portion of the aromatic phase leaving the top of said tower can be drawn off, and not recycled, and passed to suitable purification and separation means for the recovery of the alkylated aromatic compound. Still other methods for contacting the aromatic compound to be alkylated, the catalyst, and the alkylating agent involve the introduction of said reactants and catalysts into stirred or agitated reactors or contactors such as Stratco contactors. These various methods of contacting the reactants and catalysts, and apparatus employed in said contacting, are known to those skilled in the art and, per se, form no part of our invention. In other words, any suitable contacting method and apparatus can be employed in the practice of the invention.

The following examples will serve to further illustrate the invention. However, it is to be understood that said examples are included for illustrative purposes only and are not to be construed as unduly limiting the invention. The trans,trans,cis-1,5,9-cyclododecatriene used in the following examples was prepared by the method of Wilke. This material had a density at 20° C. of 0.904, a refractive index of $n_D^{20} = 1.5082$, and boiled at 100–101° C. at 11 mm. Hg pressure.

EXAMPLE I

A run was carried out in which benzene was alkylated with cyclododecatriene according to the process of this invention.

In this run, 500 ml. of benzene and 26.6 grams of anhydrous aluminum chloride were charged to a 1-liter, 3-necked flask equipped with a stirrer, condenser and dropping funnel. The resulting mixture was stirred at 25° C., and a solution of 55 grams of trans-trans,cis-1,5,9-cyclododecatriene (referred to hereafter as CDT) in 70 ml. benzene was added dropwise to the mixture, while stirring, over a two hour period. An exothermic reaction occurred, and the mixture turned dark. The rate of addition was adjusted so that the mixture was maintained at approximately 25–30° C. After the CDT had all been added, the mixture was stirred for an additional 30 minutes. The mixture was then poured onto ice and a hydrocarbon layer separated. This hydrocarbon layer was washed three times with concentrated hydrochloric acid, and then was washed three times with water. The hydrocarbon layer or mixture was then dried over sodium sulfate, and sufficient benzene was distilled off to reduce the volume of the mixture to approximately 200 ml. The last traces of water were removed in this fashion as the water azeotroped overhead with the benzene.

The concentrated mixture was then diluted with 800 ml. acetone, resulting in the precipitation of approximately 9.5 grams of a polymeric material. This polymer was filtered out, and remaining benzene and acetone were removed from the filtrate by distillation. The remaining hydrocarbon was then subjected to vacuum distillation through a 14-inch packed column. The fractionation data are given in the following Table I.

*Table I*

| Cut | B.P., ° C. | Pot Temp., ° C. | Press., mm. | Grams |
|---|---|---|---|---|
| A | 53–58 | 120–160 | 0.3 | 5.3 |
| B | 58–124 | 160–200 | 0.3 | 1.9 |
| C | 124–130 | 200–260 | 0.3 | 22.9 |

Pot residue=26.2 grams.

Cut C from the above fractionation was then refractionated in an 8-inch packed column. The fractionation data are given in the following Table II.

*Table II*

| Fraction | B.P., ° C. | Pot Temp., ° C. | Press., mm. | Grams | Refractive index, $n_D^{20}$ | Density [1] |
|---|---|---|---|---|---|---|
| 1 | 36–106 | 147–155 | 0.05 | 2.3 | | 1.0 |
| 2 | 106–108 | 155–157 | 0.1 | 2.8 | | |
| 3 | 108–110 | 157–160 | 0.1 | 11.1 | 1.5540 | 1.05 |
| 4 | 110–113 | 160–165 | 0.1 | 4.5 | 1.5540 | 1.05 |

Pot residue—2.0 grams.
[1] Density determined at 26° C.

A sample of the material from fraction 3 of Table II was subjected to carbon-hydrogen analysis. The results showed that the material contained 89.5 weight percent carbon and 10.1 weight percent hydrogen. This compares with the calculated value for $C_{18}H_{24}$ of carbon=89.9 weight percent and hydrogen=10.1 weight percent.

An infrared spectrum of fraction 3 was consistent with a monosubstituted benzene. Several bands in the spectrum were similar to those in the spectrum of phenylcyclohexane and are thus indicative of a monosubstituted benzene in which the substituent radical is a cyclic hydrocarbon radical. The spectrum also indicates that the material is a mixture of isomeric hydrocarbons.

EXAMPLE II

A 9 gram sample of fraction 3 from Example I was dissolved in 100 ml. of glacial acetic acid and hydrogenated in a Parr Hydrogenator in the presence of a platinum catalyst. The hydrogenation was attempted for several hours at room temperature, about 75 to 80° F. No appreciable absorption of hydrogen occurred at these conditions, even after additional fresh catalyst was added. The temperature was increased to 55° C. and hydrogenation occurred readily. This is to be expected where the nuclear substituent is saturated and the hydrogenation is occurring on the benzene ring.

When the hydrogenation was complete the contents of the bottle were removed and the catalyst filtered out. After washing with pentane, the combined filtrates were diluted with water and the pentane layer which separated was washed with water, sodium bicarbonate solution, and again with water before being dried over sodium sulfate. The solvent was then evaporated off on a Rinco rotating evaporator under vacuum. The remaining residue, a colorless oil, was then heated to 80–90° C. to the same vacuum. The amount of material which was recovered was 9.2 grams. This material had a density at 28° C. of 0.977 and a refractive index at 21° C. of 1.5165.

The amount of hydrogen taken up by the compound in the above hydrogenation is equivalent to 3 double bonds per molecule based on a molecular weight of 240. The infrared spectrum of this material indicated a cyclohexane ring which was substituted by a saturated cyclic hydrocarbon radical.

A sample of the hydrogenated material from Example II was also subjected to carbon-hydrogen analysis. The analysis showed that the material contained 87.5 weight percent carbon and 12.6 weight percent hydrogen. This compares with the calculated values for $C_{18}H_{30}$ of carbon=87.7 weight percent and hydrogen=12.3 weight percent.

It is apparent from the hydrogenation data, carbon-hydrogen analyses, and the infrared data from the above examples that alkylation of benzene with cyclododecatriene results in the formation of a mononuclear substituted benzene in which the one substituent is a polycyclic saturated hydrocarbon radical. This is further substantiated by the volume of hydrogen taken up which indicates that the compound contains three double bonds before hydrogenation. Since benzene contains three double bonds, the substituent group must be saturated.

The following examples show that the alkylation product of the above examples was a mononuclear substituted benzene in which the one substituent is a polycyclic saturated hydrocarbon radical.

EXAMPLE III

Another run was carried out in which trans,trans,cis-1,5,9-cyclododecatriene was contacted with a catalyst comprising phosphoric acid on kieselguhr. The acid catalyst which was used in this run had a particle size of 8–20 mesh and contained 61–65% by weight $P_2O_5$ and 4–5% by weight water. In carrying out this run, 25 ml. of the phosphoric acid on kieselguhr catalyst and 25 ml. of cyclododecatriene which was identical to that in Example I were charged to a flask and heated together at atmospheric pressure and a temperature of 130–170° C. for approximately one hour. At the end of this time, the reaction mixture was cooled to about room temperature, and the catalyst was removed by filtration. The catalyst was then washed with n-pentane, and the pentane extract was added to the filtrate. The pentane layer was extracted with 10% by weight aqueous sodium hydroxide to remove any residual acid. The hydrocarbon phase was then dried over calcium chloride, the pentane was removed by stripping, and the hydrocarbon was distilled. Eighteen grams of overhead product boiling from 35 to 45° C. at 0.1 mm.

Hg pressure were obtained. This overhead product had a density at 20° C. of 0.9532.

Hydrogenation of a sample of said overhead product in acetic acid at 740 mm. mercury absolute hydrogen pressure and 23° C. over platinum catalyst was carried out. The hydrocarbon was observed to absorb 1.0 equivalent of hydrogen.

EXAMPLE IV

A larger scale isomerization run was carried out according to the procedure of Example III, utilizing 32.4 grams of said cyclododecatriene and 25 ml. of the phosphoric acid on kieselguhr catalyst. The products obtained were $C_{12}$ hydrocarbons having a density at 20° C. of 0.9532 and a refractive index of $n_D^{20}=1.5132$. Hydrogenation of this material in acetic acid under the conditions previously used was carried out, and it was observed that 1.0 equivalent of hydrogen was absorbed by the cyclododecatriene conversion products.

A larger scale hydrogenation of said cyclododecatriene conversion products, carried out at 20 p.s.i.g. for 6 hours in acetic acid, and in the presence of platinum catalyst, resulted in a saturated material having a density at 20° C. of 0.9384 and a refractive index of $n_D^{20}=1.4966$.

Another hydrogenation of said cyclododecatriene conversion products, carried out at 1500 p.s.i.a. and 190–200° C., and in the presence of a nickel on kieselguhr catalyst, resulted in a saturated material having a density at 20° C. of 0.9385 and a refractive index of $n_D^{20}=1.4960$.

The products obtained in the isomerization run of the above Example III and said products after hydrogenation, were analyzed for carbon and hydrogen content. The results of these analyses were as follows:

|  | Carbon Content, Wt. Percent | Hydrogen Content, Wt. Percent |
| --- | --- | --- |
| Example III: |  |  |
| Product | 88.4 | 11.0 |
| Hydrogenated product | 87.5 | 12.3 |
| Trans,trans,cis-1,5,9-cyclododecatriene ($C_{12}H_{18}$) | [1] 88.9 | [1] 11.1 |
| $C_{12}H_{20}$ | [1] 87.8 | [1] 12.2 |

[1] Calculated values.

The above data show that the carbon and hydrogen values for the products of the isomerization runs agree very well with the calculated values for $C_{12}H_{18}$. The analyses of the hydrogenated products agree very well with calculated values for $C_{12}H_{20}$.

The above data show that the products of the isomerization of the cyclododecatriene in Example III was $C_{12}H_{18}$ material containing the equivalent of one carbon to carbon double bond. It is apparent that in order for said isomerization product to be $C_{12}H_{18}$ molecules containing one carbon to carbon double bond, said material must be a tricyclic compound. Accordingly, a sample of acenaphthene (Eastman M.P. 93.5–94.5 C.) was hydrogenated in acetic acid using platinum catalyst until complete hydrogenation was achieved. This perhydroacenaphthene was then subjected to infrared analysis and gas-liquid chromatography, and the spectra from these analyses were compared with the infrared and chromatography spectra of the hydrogenated isomerized product from Example IV above. The major peak in the chromatography spectrum for the hydrogenated acenaphthene had a retention time of 41 minutes, identical to the retention time for the major component (70%) in hydrogenated isomerized product. Furthermore, the infrared spectra for the hydrogenated acenaphthene and the hydrogenated isomerized product were the same, except that the bands were more intense in the infrared spectrum for the hydrogenated acenaphthene due to higher purity.

Since acetic acid solvent was required to effect hydrogenation at room temperature, and since the double bond was not observed in the infrared spectra, it is indicted that the double bond is mutual to two rings. These data indicate that the hydrogenated isomerized product contained a major proportion of octahydroacenaphthene with the unsaturation located in a central or internal position.

Since perhydroacenaphthene has the formula

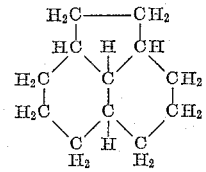

the two possibilities for the unsaturated octahydroacenaphthene in the unhydrogenated isomerized products of Examples III and IV are

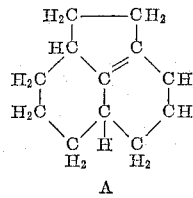 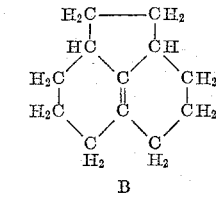

A          B

This establishes the structural formula of the major component of the isomerization products obtained in Examples III and IV above to be like the formula of at least one of the above isomers A and B.

Theoretically, either of said isomers A and B could alkylate benzene to give a mononuclear substituted benzene in which the one substituent is a polycyclic saturated hydrocarbon radical. However, the following examples show that said isomerization product of Example III cannot be used to alkylate benzene.

EXAMPLE V

In another run, an isomerization product prepared in essentially the same manner as described above in Example III, and having a chromatogram almost identical with the isomerization product of said Example III, was contacted with benzene in the presence of aluminum chloride.

In this run, 8.4 grams of anhydrous aluminum chloride and 200 ml. benzene were charged to a 500 ml. flask equipped with a stirrer, a condenser, and an addition funnel. The benzene and aluminum chloride were stirred rapidly, and a solution of 62.1 grams of said isomerization product in 60 ml. benzene was then added dropwise to the stirred mixture. This addition was carried out at room temperature and over a 2-hour period. No changes in the starting material occurred at these conditions.

The mixture was then heated to 80° C. and refluxed for 3 hours, but it was again determined that no changes in the starting material had occurred at these conditions.

Considering the results of all the above examples it is apparent that when trans,trans,cis-1,5,9-cyclododecatriene is contacted with benzene in the presence of aluminum chloride, both isomerization and alkylation must be occurring to yield a mononuclear substituted benzene in which the one substituent is a polycyclic saturated hydrocarbon radical. Examples I and II show that said substituent must be a saturated $C_{12}H_{19}$ radical. Examination of the product from Example III shows that the $C_{12}$ ring system readily isomerizes to the acenaphthene carbon skeleton, hence, the radical in the alkylation product must also have the basic structure of the above isomers A and B. Thus, the alkylated product resulting from contacting benzene and trans,trans,cis-1,5,9-cyclododecatriene in the presence of aluminum chloride in accordance with the invention must be at least one of the following three isomers.

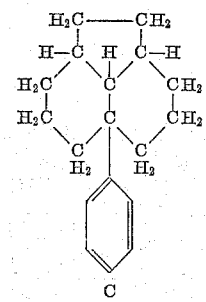
C

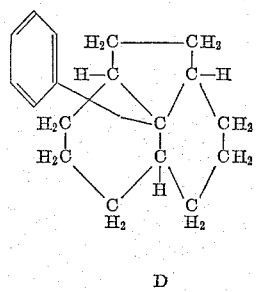
D

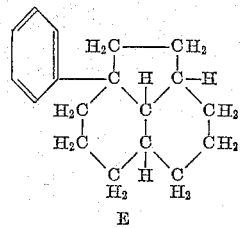
E

From the above it is believed clear that isomerization and alkylation, in some manner not specifically known at present, are both occurring in the process of the invention. Since the product of the invention is clearly analogous to an alkylate, it is preferred to refer to the process of the invention as an alkylation process. However, it is believed it would also be correct to refer to the process of the invention as one in which concomitant isomerization and alkylation occur. Thus, the process can be described as a concomitant isomerization and alkylation process for the production of alkylated aromatic compounds using a cyclododecatriene as an alkylating agent.

While the invention has been described above with particular reference to using trans,trans,cis-1,5,9-cyclododecatriene as the alkylating agent in the alkylation of alkylatable aromatic compounds, trans,trans,trans-1,5,9-cyclododecatriene can also be used in the practice of the invention. It is also within the scope of the invention to use derivatives and homologues of said cyclotrienes, particularly those derivatives having various substituents, such as alkyl radicals, attached to the ring carbon atoms. Thus, it is within the scope of the invention to use the cyclic trimers of isoprene and piperylene (1,3-pentadiene) as alkylating agents in the practice of the invention. The trimers of both of said last-mentioned dienes are trimethylcyclododecatrienes. In the case of the isoprene trimer, each of the three methyl groups is attached to a carbon atom which is attached to an adjacent carbon atom by a double bond. In the piperylene trimer the methyl groups are attached to carbon atoms which are attached to adjacent carbon atoms by single bonds.

The alkylated aromatic compounds of this invention have wide utility and can be employed for a number of purposes. For example, the alkylate resulting from the alkylation of benzene with cyclododecatriene is of very high density and can thus be used to great advantage as a jet engine fuel or jet engine fuel component. Because of its high density, the pounds per gallon is much higher and a plane can thus carry a larger weight of fuel in tanks of given volume. The alkylation products, including hydrocarbons, can be further treated to form other compounds by processes such as hydrogenation. Hydrogenation of these compounds can be carried out at pressures generally ranging from about atmospheric to about 3000 p.s.i. Hydrogenation catalysts such as platinum, palladium, nickel, and the like can be used, and hydrogenation solvents such as saturated hydrocarbons and low molecular weight organic acids are very satisfactory. The hydrogenated hydrocarbon alkylates can also be used as fuels if desired.

As used herein, unless otherwise specified, the term "one hydrogen equivalent" is the amount of hydrogen required to reduce one "carbon to carbon" double bond, calculated on the basis that the compound being reduced had a molecular weight of 162 ($C_{12}H_{18}$).

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A nuclear substituted aromatic compound characterized by having a substituent on the aromatic nucleus thereof which is a saturated radical selected from the group consisting of

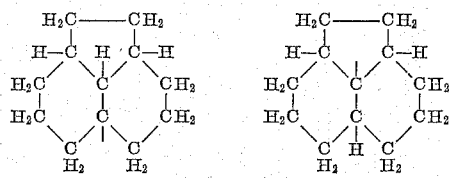

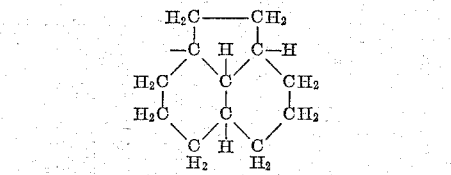

2. A nuclear substituted benzene characterized by having a substituent on the benzene ring which is a saturated radical selected from the group consisting of

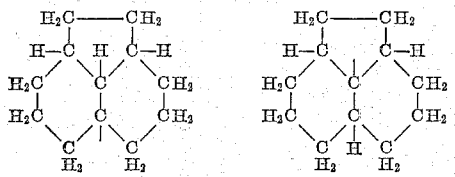

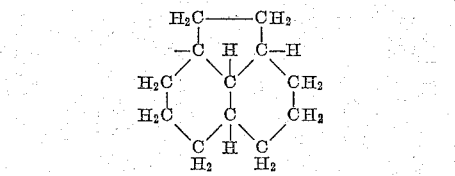

3. A substituted benzene according to claim 2 wherein said substituent is the only substituent on the benzene ring.

4. A process for the alkylation of aromatic hydrocarbons with a cyclotriene hydrocarbon, which process comprises: contacting an aromatic compound having at least one alkylatable nuclear carbon atom with a cyclotriene hydrocarbon selected from the group consisting of monocyclictriene hydrocarbons having 12 carbon atoms in the ring and carbon to carbon double bonds in the 1, 5, and 9 positions in said ring and trimethyl derivatives thereof in the presence of an acid-acting alkylation catalyst under alkylation conditions; and recovering an alkylated aromatic compound from the resulting reaction mixture.

5. A process according to claim 4 wherein said aromatic compound is an aromatic hydrocarbon.

6. An alkylation process which comprises contacting an aromatic compound having at least one alkylatable nuclear carbon atom with trans,trans,cis-1,5,9-cyclododecatriene in the presence of an acidic alkylation catalyst under alkylation reaction conditions and recovering an alkylated aromatic compound from the resulting reaction mixture.

7. A process according to claim 6 wherein said aromatic compound is a hydrocarbon.

8. A process according to claim 7 wherein said aromatic hydrocarbon is benzene.

9. An alkylation process which comprises contacting an aromatic compound having at least one alkylatable nuclear carbon atom with trans,trans,cis-1,5,9-cyclododecatriene in the presence of an acidic alkylation catalyst, at a temperature within the range of —50 to +150° F., under a pressure sufficient to maintain liquid phase conditions, and recovering an alkylated aromatic compound from the resulting reaction mixture.

10. The process of claim 9 wherein said aromatic compound is a hydrocarbon.

11. The process of claim 10 wherein said aromatic hydrocarbon is benzene and said catalyst is aluminum chloride.

12. An alkylation process which comprises contacting an aromatic compound having at least one alkylatable nuclear carbon atom with 1,5,9-trimethylcyclododecatriene in the presence of an acidic alkylation catalyst under alkylation reaction conditions and recovering an alkylated aromatic compound from the resulting reaction mixture.

13. A process according to claim 12 wherein said aromatic compound is a hydrocarbon.

14. A process according to claim 13 wherein said aromatic hydrocarbon is benzene.

15. An alkylation process which comprises contacting an aromatic compound having at least one alkylatable nuclear carbon atom with 1,5,9-trimethylcyclododecatriene in the presence of an acidic alkylation catalyst, at a temperature within the range of —50 to +150° F., under a pressure sufficient to maintain liquid phase conditions, and recovering an alkylated aromatic compound from the resulting reaction mixture.

16. A process according to claim 15 wherein said aromatic hydrocarbon is benzene and said catalyst is aluminum chloride.

17. A process for the preparation of a nuclear substituted aromatic compound characterized by having on an aromatic ring thereof a substituent consisting of a saturated radical selected from the group consisting of

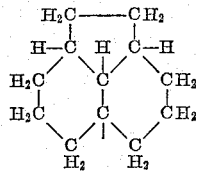 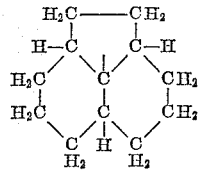

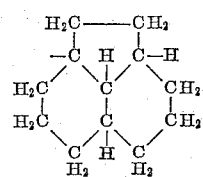

which process comprises: contacting trans,trans,cis-1,5,9-cyclododecatriene with an aromatic compound selected from the group consisting of monocyclic and polycyclic aromatic compounds having at least one alkylatable nuclear carbon atom, in the presence of an aluminum chloride catalyst, at a temperature within the range of —50 to +150° F., under a pressure sufficient to maintain liquid phase conditions, and recovering said substituted aromatic compound from the resulting reaction mixture.

18. A process for the preparation of a mononuclear substituted benzene in which the substituent on the benzene ring is a saturated radical selected from the group consisting of

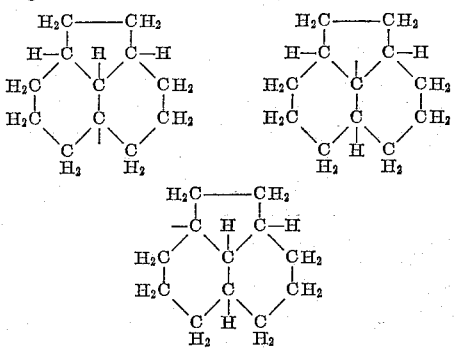

which process comprises: contacting benzene with trans,trans,cis-1,5,9-cyclododecatriene, in the presence of an aluminum chloride catalyst, at a temperature within the range of —50 to +150° F., under a pressure sufficient to maintain liquid phase conditions, and recovering said substituted benzene from the resulting reaction mixture.

References Cited in the file of this patent

Ipatieff et al.: J.A.C.S., vol. 72, pp. 4260–2 (1950).
Burtner: J.A.C.S., vol. 75, pp. 2334–40 (1953).
Bader: J.A.C.S., vol. 75, pp. 5967–9 (1953).